(12) United States Patent
Mao et al.

(10) Patent No.: US 7,618,678 B2
(45) Date of Patent: Nov. 17, 2009

(54) CARBON-COATED SILICON PARTICLE POWDERS AS THE ANODE MATERIAL FOR LITHIUM ION BATTERIES AND THE METHOD OF MAKING THE SAME

(75) Inventors: Zhenhua Mao, Ponca City, OK (US); Bharat Chahar, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/741,381

(22) Filed: Dec. 19, 2003

(65) Prior Publication Data
US 2005/0136330 A1    Jun. 23, 2005

(51) Int. Cl.
*B05D 7/00*    (2006.01)
(52) U.S. Cl. ................................. 427/212; 427/228
(58) Field of Classification Search .............. 427/212, 427/228
See application file for complete search history.

(56) References Cited

U.S. PATENT DOCUMENTS

| | | | |
|---|---|---|---|
| 4,064,330 A | 12/1977 | Gaines, Jr. et al. | 429/218 |
| 4,199,363 A * | 4/1980 | Chen | 430/512 |
| 4,503,026 A * | 3/1985 | Dickakian | 423/447.4 |
| 4,550,064 A | 10/1985 | Yen et al. | 429/94 |
| 4,619,805 A * | 10/1986 | Dias et al. | 264/29.5 |
| 4,980,250 A | 12/1990 | Takahashi | |
| 5,028,500 A | 7/1991 | Fong et al. | 429/194 |
| 5,030,529 A | 7/1991 | Wada et al. | 429/209 |
| 5,053,295 A | 10/1991 | Hope et al. | 429/161 |
| 5,069,683 A | 12/1991 | Fong et al. | 429/218 |
| 5,162,175 A | 11/1992 | Visco et al. | 429/192 |
| 5,168,019 A | 12/1992 | Sugeno | 429/194 |
| 5,171,413 A | 12/1992 | Arntz et al. | 204/192.15 |
| 5,196,279 A | 3/1993 | Tarascon | 429/194 |
| 5,238,760 A | 8/1993 | Takahashi et al. | 429/194 |

(Continued)

FOREIGN PATENT DOCUMENTS

JP    61034222 A  *  2/1986

(Continued)

OTHER PUBLICATIONS

D. Larcher, et al., *Si-containing disordered carbons prepared by pyrolysis of pitch/polysilane blends: effect of oxygen and sulfur*, Solid State Ionics, vol. 122, Issues 1-4, 71-83 (1999).

(Continued)

*Primary Examiner*—Elena T Lightfoot

(57) ABSTRACT

A process for the production of coated silicon/carbon particles comprising:
 providing a carbon residue forming material;
 providing silicon particles;
 coating said silicon particles with said carbon residue forming material to form coated silicon particles;
 providing particles of a carbonaceous material;
 coating said particles of carbonaceous material with said carbon residue forming material to form coated carbonaceous particles;
 embedding said coated silicon particles onto said coated carbonaceous particles to form silicon/carbon composite particles;
 coating said silicon/carbon composite particles with said carbon residue forming material to form coated silicon/carbon composite particles; and
 stabilizing the coated composite particles by subjecting said coated composite particles to an oxidation reaction.

The coated composite particles will have a substantially smooth coating. The particles may be coated with multiple layers of carbon residue forming material.

37 Claims, 6 Drawing Sheets

U.S. PATENT DOCUMENTS

| | | | |
|---|---|---|---|
| 5,256,504 A | 10/1993 | Okuno et al. | 429/197 |
| 5,326,658 A | 7/1994 | Takahashi et al. | 429/194 |
| 5,352,548 A | 10/1994 | Fujimoto | |
| 5,387,479 A | 2/1995 | Koksbang | |
| 5,436,093 A | 7/1995 | Huang | |
| 5,451,477 A | 9/1995 | Omaru et al. | 429/218 |
| 5,474,862 A | 12/1995 | Okuno | |
| 5,482,797 A | 1/1996 | Yamada et al. | 429/218 |
| 5,498,493 A | 3/1996 | Dahn et al. | 429/218 |
| 5,510,212 A | 4/1996 | Delnick et al. | 429/218 |
| 5,565,284 A | 10/1996 | Koga | |
| 5,595,838 A | 1/1997 | Yamada | |
| 5,612,155 A | 3/1997 | Takami | |
| 5,639,575 A | 6/1997 | Omaru et al. | 429/197 |
| 5,656,394 A | 8/1997 | Koksbang | |
| 5,683,834 A | 11/1997 | Fujimoto et al. | 429/218 |
| 5,705,222 A * | 1/1998 | Somasundaran et al. | 427/220 |
| 5,753,387 A | 5/1998 | Takami | |
| 5,776,610 A | 7/1998 | Yamada | |
| 5,798,033 A | 8/1998 | Uemiya | |
| 5,882,818 A | 3/1999 | Fujimoto et al. | 429/197 |
| 5,894,403 A | 4/1999 | Shah | |
| 5,900,336 A | 5/1999 | Kabata | |
| 5,993,997 A | 11/1999 | Fujimoto et al. | 429/231.8 |
| 6,008,569 A | 12/1999 | Yamanobe | |
| 6,022,518 A * | 2/2000 | Yamazaki et al. | 423/448 |
| 6,060,190 A | 5/2000 | Campbell | |
| 6,066,413 A | 5/2000 | Aymard | |
| 6,083,645 A | 7/2000 | Takeuchi et al. | 429/231.8 |
| 6,096,454 A | 8/2000 | Tran et al. | 429/231.8 |
| 6,118,573 A | 9/2000 | Kubo | |
| 6,123,829 A * | 9/2000 | Zimmerman et al. | 208/44 |
| 6,156,432 A | 12/2000 | Mabuchi | |
| 6,218,050 B1 | 4/2001 | Yoon et al. | 429/231.8 |
| 6,235,427 B1 | 5/2001 | Idota et al. | 429/218.1 |
| 6,265,110 B1 | 7/2001 | Rao | |
| 6,294,291 B1 | 9/2001 | Ozaki et al. | 429/231.4 |
| 6,342,319 B1 | 1/2002 | Kuboki et al. | 429/231.8 |
| 6,350,544 B1 | 2/2002 | Takami et al. | 429/231.4 |
| 6,355,377 B1 | 3/2002 | Sheem et al. | 429/231.8 |
| 6,383,467 B1 | 5/2002 | Honbo et al. | 423/448 |
| 6,383,686 B1 | 5/2002 | Umeno et al. | 429/231.8 |
| 6,391,495 B1 | 5/2002 | Choi | |
| 6,395,427 B1 | 5/2002 | Sheem et al. | 429/231.8 |
| 6,403,259 B1 | 6/2002 | Kitagawa et al. | 429/231.4 |
| 6,413,672 B1 | 7/2002 | Suzuki | |
| 6,432,583 B1 | 8/2002 | Fukuda et al. | 429/231.4 |
| 6,436,573 B1 | 8/2002 | Goto | |
| 6,440,610 B1 | 8/2002 | Sheem | |
| 6,475,670 B1 | 11/2002 | Ito | |
| 6,482,547 B1 | 11/2002 | Yoon | |
| 6,503,660 B2 | 1/2003 | Baker et al. | 429/231.95 |
| 6,506,520 B1 | 1/2003 | Inoue | |
| 6,528,212 B1 | 3/2003 | Kusumoto et al. | 429/233 |
| 6,541,156 B1 | 4/2003 | Fuse et al. | 429/218.1 |
| 6,569,557 B1 | 5/2003 | Kitoh | |
| 6,589,694 B1 | 7/2003 | Gosho et al. | 429/231.1 |
| 6,589,696 B2 | 7/2003 | Matsubara et al. | 429/231.8 |
| 6,605,386 B1 | 8/2003 | Kasamatsu | |
| 6,623,889 B2 | 9/2003 | Morita et al. | 429/231.8 |
| 6,627,352 B1 | 9/2003 | Okochi | |
| 6,723,471 B2 | 4/2004 | Kitagawa | |
| 6,733,922 B2 * | 5/2004 | Matsubara et al. | 429/231.8 |
| 6,749,892 B2 | 6/2004 | Chang | |
| 6,884,350 B2 * | 4/2005 | Muller | 210/500.36 |
| 2002/0074972 A1 | 6/2002 | Narang et al. | 320/131 |
| 2002/0168574 A1 | 11/2002 | Ahn et al. | 429/232 |
| 2004/0042954 A1 * | 3/2004 | Park et al. | 426/445 R |

FOREIGN PATENT DOCUMENTS

| | | | |
|---|---|---|---|
| JP | 03187908 A | * | 8/1991 |
| JP | 09-231974 A | | 9/1997 |
| JP | 11-246209 A | | 9/1999 |
| JP | 01-305859 A | | 12/1999 |
| JP | 2000239079 A | * | 9/2000 |
| JP | 2002008656 A | * | 1/2002 |

OTHER PUBLICATIONS

Wang, et al., *Electrochemical study on nano-Sn, $Li_{4.4}Sn$ and $AlSi_{0.1}$ powders used as secondary lithium battery anodes*, Journal of Power Sources, 93, Nos. 1-2, 174-185 (2001).

Yang-Kook Sun, et al., *Synthesis and characterization of spinel $LiMn_{2-x}Ni_xO_4$ for lithium/polymer battery applications*, Journal of Power Sources, 79, 231-237 (1999).

Dr. Hong Shih, et al., *Electrochemical Impedance Spectroscopy for Battery Research and Development*, Technical Report 31, © Solartron 1996, 1-61.

Wilson, et al., *Pyrolysed silicon-containing polymers as high capacity anodes for lithium-ion batteries*, Journal of Power Sources 68, 195-200 (1997).

Kurita, et al., *Molecular orbital calculations on electronic and Li-adsorption properties of sulfur-, phosphorus- and silicon-substituted disordered carbons*, Carbon 40, 253-260 (2002).

Xing, et al., *Pyrolyzed Polysiloxanes for Use as Anode Materials in Lithium-Ion Batteries*, J. Electrochem Soc., vol. 144, No. 7, Jul. 1997.

Wen, et al., "*High capacity silicon/carbon composite anode materials for lithium ion batteries*," Electrochemistry Communications 5, 165-168 (2003).

Yang, et al., "*Small particle size multiphase Li-alloy anodes for lithium-ion-batteries*," Solid State Ionics 90, 281-287 (1996).

Besenhard, "*Will advanced lithium-alloy anodes have a chance in lithium-ion batteries?*" Journal of Power Sources 68, 87-90(1997).

Masaki Yoshio, Nikolay Dimov, Takashi Iwao, Kenji Fukuda, Tatsuo Umeno, Department of Applied Chemistry, Saga University, Saga, Japan, Sep. 2001.

* cited by examiner

CARBON-COATED SILICON PARTICLE POWDERS AS THE ANODE MATERIAL FOR LITHIUM ION BATTERIES AND THE METHOD OF MAKING THE SAME

TECHNICAL FIELD OF THE INVENTION

The present invention relates to silicon/carbon composite materials that are useful as electrode active materials in batteries. More particularly, the present invention relates to carbon-coated silicon particles that find particular use as electrode materials, as well as methods for the manufacture of said carbon-coated silicon particles.

BACKGROUND OF THE INVENTION

Synthetic graphites are widely used as standard negative electrode materials in lithium ion batteries. Other carbonaceous materials are also widely used in such batteries due to their efficiency and reasonable cost. Lithium ion batteries are primarily used as power sources in portable electronic devices. Compared to other classes of rechargeable batteries such as nickel-cadmium and nickel-metal hydride storage cells, lithium ion cells have become increasingly popular due to relatively high storage capacity and rechargeability.

Due to increased storage capacity per unit mass or unit volume over similarly rated nickel-cadmium and nickel-metal hydride storage cells, the smaller space requirements of lithium ion cells allow production of cells that meet specific storage and delivery requirements. Consequently, lithium ion cells are popularly used in a growing number of devices, such as digital cameras, digital video recorders, computers, etc., where compact size is particularly desirable from a utility standpoint.

Nonetheless, rechargeable lithium ion storage cells are not without deficiencies. These deficiencies may be minimized with the use of improved materials of construction. Commercial lithium ion batteries which use synthetic graphite electrodes are expensive to produce and have low relatively lithium capacities. Additionally, graphite products currently used in lithium ion electrodes are near their theoretical limits for energy storage (372 mAhr/g). Accordingly, there is a need in the art for improved electrode materials that reduce the cost of rechargeable lithium batteries and provide improved operating characteristics, such as higher energy density, greater reversible capacity and greater initial charge efficiency. There also exists a need for improved methods for the manufacture of such electrode materials.

Silicon has been investigated as an anode material for lithium ion batteries because silicon can alloy with a relatively large amount of lithium, providing greater storage capacity. In fact, silicon has a theoretical lithium capacity of more than ten times that of graphite. However, pure silicon is a poor electrode material because its unit cell volume can increase to more than 300% when lithiated. This volume expansion during cycling destroys the mechanical integrity of the electrode and leads to a rapid capacity loss during battery cycling. Although silicon can hold more lithium than carbon, when lithium is introduced to silicon, the silicon disintegrates and results in less electrical contact which ultimately results in decreased ability to recharge the storage cell.

Continuous research efforts in solving silicon volume expansion problems have yielded limited results. Silicon/carbon composite particles or powders have good cycle life compared to mechanical mixtures of carbon and silicon powders made by milling or other mechanical methods. Thin film silicon-coated carbon particles or carbon-coated silicon powders are potential replacements for graphite powders as the anode material for next generation lithium ion batteries. However, chemical vapor deposition methods typically used to apply silicon coatings or carbon coatings have intrinsic shortcomings that include slow deposition rates and/or expensive precursors for deposition. Vapor deposited silicon films may be extremely expensive relative to the cost of bulk silicon powders. Therefore, another method of manufacturing coated silicon particles is needed.

SUMMARY OF THE INVENTION

The present invention provides processes for the manufacture of the silicon/carbon composite materials. The silicon/carbon composite materials comprise coated silicon particles that are combined with coated carbon particles; wherein the resulting silicon/carbon composite particle is further coated with a layer of oxidized, carbon residue-forming material. These carbon-coated silicon/carbon composite particles are useful in the manufacture of electrodes in electrical storage cells, particularly in rechargeable lithium ion electrical storage cells.

The compositions of the invention provide high capacity and high efficiency carbon-coated silicon/carbon composite particles that can be derived from a wide variety of carbon sources. In a further aspect of the invention, the silicon/carbon composite particle may be coated with multiple layers of carbon residue forming material. In a still further aspect of the invention, the coating layer(s) of the composite particle may be optionally carbonized.

The compositions of the present invention provide carbon-coated silicon/carbon composite particles with substantially smooth coatings. Additionally, the compositions feature good powder flowability, which is particularly beneficial during the handling or manufacturing steps necessary to form these materials into useful electrodes or into other articles not specifically described herein.

In further aspects of the invention there are provided methods for the manufacture of such carbon-coated silicon/carbon composite particles. The carbon-coated powders prepared in accordance with the invention not only increase charge efficiency but also provide excellent processability for electrode fabrication. In a yet further aspect of the invention there are provided methods for the manufacture of electrical storage cells, particularly rechargeable batteries that include said carbon-coated composite particles. A still further aspect of the invention relates to the use of said carbon-coated composite particles in electrical storage cells, particularly in rechargeable batteries.

These and other aspects and features of the invention will become apparent from the following description of the invention and preferred embodiments thereof.

DETAILED DESCRIPTION

Figure 1:
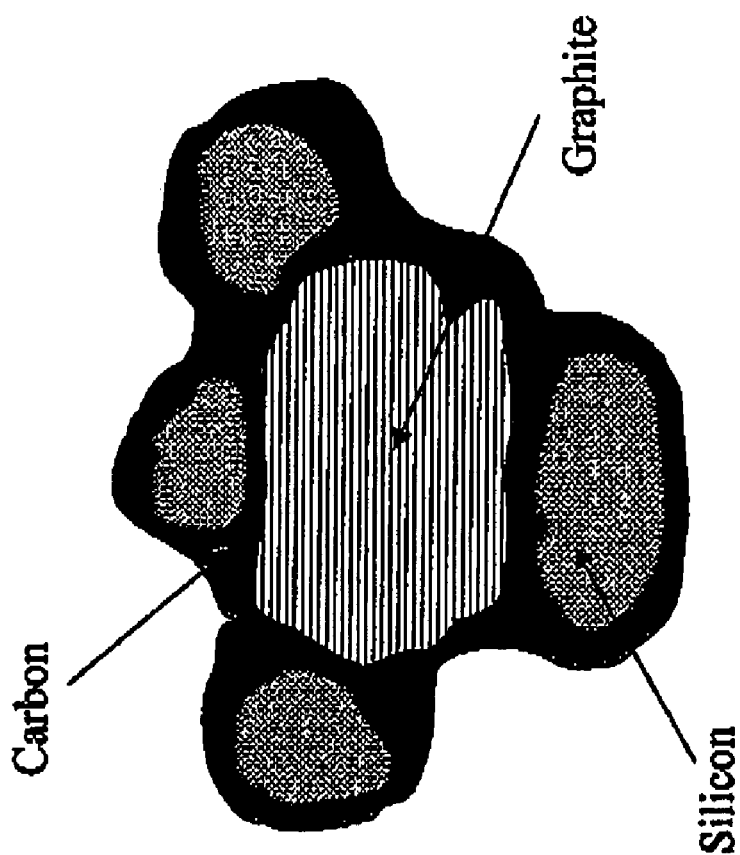
FIG. 1 shows a schematic view of a composite carbon-silicon particle according to the present invention.

The present invention provides processes for the manufacture of silicon/carbon composite particles, which particles exhibit improved operating characteristics when used as electrodes in electrical storage cells, particularly in rechargeable electrical storage cells. Generally, the process contemplates combining coated fine silicon powders with coated carbonaceous particles to form a silicon/carbon composite particle and further coating the composite particle with a layer or layers of carbon residue-forming material.

More specifically, particles of a carbonaceous material substrate are coated with a fusible, carbon residue-forming material. Particles of fine silicon powders, which have been coated with a fusible, carbon residue-forming material, are embedded onto the coated carbonaceous particle to form a composite particle of silicon and carbonaceous materials. The silicon/carbon composite particle is further provided with at least one coating of a fusible, carbon residue-forming material. The coated silicon/carbon composite particle is thereafter stabilized by subjecting said coated composite particle to an oxidation reaction using an oxidizing agent. The stabilized coated composite particle is thereafter carbonized.

While it is possible to embed uncoated silicon particles onto a coated carbonaceous substrate material, it is preferable that the silicon particles be coated prior to embedding the silicon onto the carbonaceous substrate material to achieve an enhancement in cycling ability and mechanical strength over that of composite particle comprising uncoated silicon powder.

The silicon/graphite composite particle may be further coated with additional layer(s) of carbon residue-forming material following stabilization or optional carbonization.

It is preferable to apply a coating onto the carbonaceous particle prior to applying the silicon particles. It is preferable to embed coated silicon particles onto the coated carbonaceous substrate. Alternatively, uncoated silicon particles may be embedded onto the coated carbonaceous substrate. Further, it is preferable to coat the silicon/carbon composite particle to enhance the mechanical strength of the composite, resulting in longer lasting silicon composite electrodes. Preferably, the process provides carbon-coated silicon/carbon composite particles having substantially smooth coatings. Optionally, the composite particles may be coated repeatedly with carbon residue forming material to further increase the mechanical strength of the particles.

In the preferred embodiment, particles of carbonaceous substrate material are required for the practice of the invention. These may be obtained from a variety of sources, examples of which include petroleum and coal tar cokes, synthetic and natural graphite, or pitches as well as other sources of carbonaceous materials that are known in the manufacture of prior art electrodes, although these sources are not elucidated here. Preferred sources of carbonaceous materials include calcined or uncalcined petroleum cokes as well as synthetic graphite. Preferred sources of carbonaceous materials also include calcined or uncalcined, highly crystalline "needle" cokes. Particularly preferred sources of carbonaceous material include natural graphite and flake coke. Thus, preferred carbonaceous materials are either graphitic materials or materials which form graphite on heating to graphitization temperatures of 2200° C. or higher.

Fine particles of such carbonaceous substrate material are conveniently provided by milling, crushing, grinding or by any other means that can be used to provide a pulverant carbonaceous substrate material having particles of dimensions that are suitable for use in the formation of electrodes. Although the principles of the present invention are believed to be applicable to carbonaceous substrate particles of varying sizes and particle size distributions, preferred carbonaceous substrate particles having average particle sizes up to about 50 µm, more preferably from about 1 to about 30 µm.

Particles of silicon are required for the practice of the invention; such particles may be used alone or in conjunction with the carbonaceous substrate material. The purity of the silicon may be of ordinary industrial strength, i.e., 97-98 wt. %. Although the principles of the present invention are believed to be applicable to silicon particles of varying sizes and particle size distributions, preferred silicon particles having average particle sizes up to about 50 µm, more preferably from about 0.03 to about 20 µm.

According to steps in the inventive process, the silicon particles, carbonaceous substrate particles and silicon/carbon composite particles are provided with a fusible, carbon residue-forming material as a coating material. Preferred for use as coating materials are carbon residue-forming materials that are capable of being reacted with an oxidizing agent. Preferred compounds include those with a high melting point and a high carbon yield after thermal decomposition. Exemplary useful coating materials include heavy aromatic residues from petroleum, chemical process pitches; lignin from pulp industry; phenolic resins; and carbohydrate materials such as sugars and polyacrylonitriles. Especially preferred for use as coating materials are petroleum and coal tar pitches and lignin that are readily available and have been observed to be effective as fusible, carbon residue-forming materials.

It is to be understood that the carbon residue-forming material provided as the coating for the carbonaceous, silicon or silicon/carbon composite particles, as the case may be, may be any material which, when oxidized and then thermally decomposed in an inert atmosphere to a carbonization temperature of 850° C. or an even greater temperature forms a residue which is "substantially carbon". It is to be understood that "substantially carbon" indicates that as the residue is at least 95% by weight carbon, it is also preferred that the carbon residue-forming material form at least 10%, and preferably at least 40% and more preferably at least 60% carbon residue on carbonization, based on the original mass of the carbon residue-forming coating for the carbonaceous substrate, silicon or silicon/carbon composite particle.

It should be understood that the coatings used for one type of particle may vary significantly from the coatings used for another type of particle. By way of non-limiting examples, the carbon residue forming material provided as a coating for the carbonaceous substrate particles may be composed of a completely different carbon residue forming material as that provided as a coating for the silicon particles or for that provided as a coating for composite particles. Further, subsequent coatings provided for composite particles may be composed of carbon residue forming materials that differ from coatings applied to the carbonaceous or silicon particles, or from the previous coatings on the composite particles.

Any organic compound that can be oxidized and then thermally decomposed to yield carbon residue can be used as the coating material. However, in coating processes in which the organic compounds are dissolved in solvent, aromatics compounds that include various molecular weights are preferred because of the mutual dissolution of the compound with the solvent. Preferred compounds include those with a high melting point and a high carbon yield after thermal decomposition (e.g., petroleum and coal tar pitches).

Any useful technique for coating the carbonaceous, silicon or composite particles may be used. By way of non-limiting examples, useful techniques include the steps of: liquefying the carbon residue-forming material by a means such as melting or forming a solution with a suitable solvent combined with a coating step such as spraying the liquefied carbon residue-forming material onto the subject particle, or dipping the particle in the liquefied carbon residue-forming material and subsequently drying out any solvent.

A particularly useful method of forming a uniform coating of a carbon residue-forming material by precipitating the material onto the surface of the carbonaceous, silicon or silicon/carbon composite particles is provided according to the following process. First, a concentrated solution of the carbon residue-forming material in a suitable solvent is formed. The solution of carbon residue-forming material is prepared by combining the carbon residue-forming material with a solvent or a combination of solvents. The solvent should be compatible with the carbon residue-forming material and should dissolve all or a substantial portion of the coating material. Solvents include pure organic compounds or a mixture of different solvents. The choice of solvent(s) depends on the particular coating material used.

Suitable solvents for dissolving the carbon residue-forming material include, e.g., benzene, toluene, xylene, quinoline, tetrahydrofuran, naphthalene, acetone, cyclohexane, and tetrahydronaphthalene (sold by Dupont under the trademark Tetralin), ether, water and methyl-pyrrolidinone, etc. When petroleum or coal tar pitch is used as the carbon residue-forming material or coating material, e.g., solvents such as toluene, xylene, quinoline, tetrahydrofuran, Tetralin, or naphthalene are preferred. The ratio of the solvent(s) to the carbon residue-forming material for the carbonaceous, silicon or composite particle in the solution and the temperature of the solution is controlled so that the carbon residue-forming material completely or almost completely dissolves into the solvent. Typically, the solvent to carbon residue-forming material ratio is less than 2, and preferably about 1 or less, and the carbon residue-forming material is dissolved in the solvent at a temperature that is below the boiling point of the solvent.

Concentrated solutions wherein the solvent-to-solute ratio is less than 2:1 are commonly known as flux solutions. Many pitch-type materials form concentrated flux solutions wherein the pitch is highly soluble when mixed with the solvent at solvent-to-pitch ratios of 0.5 to 2.0. Dilution of these flux mixtures with the same solvent or a solvent in which the carbon residue-forming material is less soluble results in partial precipitation of the carbon residue-forming coating material. When this dilution and precipitation occurs in the presence of a suspension of carbonaceous, silicon or composite particles, the particles act as nucleating sites for the precipitation. The result is an especially uniform coating of the carbon residue material on the particles.

The coating layer of the subject particle, whether carbonaceous substrate, silicon, or silicon/carbon composite, can be applied by mixing the particles into a solution of carbon residue-forming material directly. When the particles are added to the solution of carbon residue-forming material directly, additional solvent(s) is generally added to the resulting mixture to effect partial precipitation of the carbon residue-forming material. The additional solvent(s) can be the same as or different than the solvent(s) used to prepare the solution of the carbon residue-forming materials.

An alternative method to precipitation would require a suspension of carbonaceous substrate, silicon or silicon/carbon composite particles be prepared by homogeneously mixing the particles in the same solvent used to form the solution of carbon residue-forming material, in a combination of solvent(s) or in a different solvent to a desired temperature, preferably below the boiling point of the solvent(s). The suspension of the target particles is then combined with the solution of carbon residue-forming material causing a certain portion of the carbon residue-forming material to deposit substantially uniformly on the surface of the particles.

The total amount and morphology of the carbon residue-forming material that precipitates onto the surface of a particle depends on the portion of the carbon residue-forming material that precipitates out from the solution, which in turn depends on the difference in the solubility of the carbon residue-forming material in the initial solution and in the final solution. When the carbon residue-forming material is a pitch, wide ranges of molecular weight species are typically present. One skilled in the art would recognize that partial precipitation of such a material would fractionate the material such that the precipitate would be relatively high molecular weight and have a high melting point, and the remaining solubles would be relatively low molecular weight and have a low melting point compared to the original pitch.

The solubility of the carbon residue-forming material in a given solvent or solvent mixture depends on a variety of factors including, for example, concentration, temperature, and pressure. As stated earlier, dilution of concentrated flux solutions causes solubility to decrease. Since the solubility of the carbon residue-forming material in an organic solvent increases with temperature, precipitation of the coating is further enhanced by starting the process at an elevated temperature and gradually lowering the temperature during the coating process. The carbon residue-forming material can be deposited at either ambient or reduced pressure and at a temperature of about −5° C. to about 400° C. By adjusting the total ratio of the solvent to the carbon residue-forming material and the solution temperature, the total amount and hardness of the precipitated carbon residue-forming material on the carbonaceous, silicon or composite particles can be controlled.

The suspension of carbonaceous substrate, silicon or silicon/carbon composite particles in the final diluted solution of carbon residue-forming material generally has a ratio of solvent to carbon residue-forming material of greater than about 2; and preferably greater than about 4. It would be understood by one skilled in the art that the specific solvent to carbon residue-forming pitch ratio at the conclusion of the coating process depends on the carbon residue-forming material and solvent selected for the process. On one hand, it is desirable to use as little solvent as possible because of the cost of solvent, while on the other hand, enough solvent is required so that the particles can be dispersed in the solvent.

Upon completion of the precipitation step, the coated particles are separated from the mixture of solvent, particles, and carbon residue-forming material using conventional methods, such as, for example, centrifugal separation, or filtration. The particles are optionally washed with solvent to remove residual pitch (or other carbon forming residue forming material) solution and dried using conventional methods.

According to an inventive step of the process, the silicon/carbon composite particle is produced by co-precipitating pitch onto a mixture of uncoated fine silicon powder particles and coated, relatively coarse carbonaceous particles simultaneously, thereby effectively embedding silicon particles onto the coating layer of the relatively large carbonaceous substrate particles. The resulting silicon/carbon composite particle is thereafter coated with pitch.

Alternatively, the silicon/carbon composite particle may be produced by separately coating silicon particles and carbonaceous substrate particles with pitch in separate containers; thereafter the coated particles are mixed together in a solution of pitch and solvent to embed the coated silicon particle onto the coated carbonaceous substrate particle.

According to a further step of the invention process, the coating layer of the silicon, carbon and silicon/carbon composite particles are rendered partly or completely infusible, preferably by oxidative stabilization. The coating of the particles are stabilized by subjecting said particles to an oxidation reaction using an oxidizing agent under appropriate reaction conditions. Generally, only mild-to-moderate reaction conditions are required. Typically, contacting the coated particles with an oxidizing agent at mild conditions and activating the oxidizing agent at elevated conditions satisfactorily perform the oxidation reaction. Contact with the oxidizing agent can occur at ambient temperatures (approximately 20° C.) or at moderately elevated temperatures (up to approximately 400° C.). Activation of the oxidizing agent would typically occur at moderately elevated temperatures up to 400° C. Preferably the temperature of the oxidation reaction is maintained below the instantaneous melting point of the coating material so as to insure that melting point of the coating material is not exceeded during the oxidation reaction.

According to a further step of the inventive process, the stabilized coated silicon, carbonaceous substrate particles or silicon/carbon composite particles may be optionally carbonized. The degree to which the surface of the coating is rendered infusible by stabilization is dependent upon the type of pitch used as well as the solvents or combination of solvents used. Further, if multiple layers of coating are desired, it is preferable to apply additional layers of coating following stabilization or carbonization. The final coating on a composite particle with multiple coatings is preferably carbonized.

The stabilization step of the current invention is carried out to render the surface of the coating layer infusible to the subsequent carbonization. Oxidative stabilization allows the smooth surface produced in the coating process to be preserved in the coated composite particles of the instant invention, as the oxidative stabilization renders the surface of the coating infusible to the subsequent processing steps.

Heat treatment of the stabilized coated particles is desirably conducted in a controlled manner in order to minimize fusion of the particles. One skilled in the art will recognize that highly stabilized, infusible, coated particles can be heated relatively aggressively and quickly during carbonization. In contrast, relatively mildly stabilized coated particles require slower heating in order to avoid excessive melting of the coating and fusion of the particles. Use of a fluidized bed during stabilization and heat treatment is especially beneficial in preventing clumping and fusion of the coated particles.

With regard to the temperature required to insure carbonization for coated particles, desirably this is achieved by raising the temperature in a controlled manner from a starting temperature, usually ambient temperature, to the final carbonization temperature which falls within the above-identified range of about 400° C. to about 1500° C., preferably within the range of about 800° C. to about 1300° C., and more preferably within the range of about 900° C. and 1200° C.

With regard to the atmospheric conditions for the carbonization process for the stabilized coated particles, the atmosphere may be ambient air up to about 850° C. but an inert atmosphere is preferred at temperatures above about 400° C. Ambient air is an acceptable atmosphere when the oxygen is largely displaced during heating or during heating under vacuum. Suitable inert atmospheres include nitrogen, argon, helium, etc., which are non-reactive with the heated coated particles.

It is understood that during the heating of the coated particles, particular attention must be paid to ensure that neither the temperatures attained during this heating process, nor the rate of the temperature rise during any part of the heating process be such that the instantaneous melting point of the coating on the particles is exceeded. More simply stated, the thermal degradation of the coating is to be effected by a controlled temperature rise wherein the process temperature is maintained at or below the instantaneous melting point of the coating where said melting point is generally increasing with time during the process. In view of this requirement, preferred heating processes are those that exhibit slower rates of temperature rise.

The most preferred aspects of the invention result in the provision of a smooth coating upon the silicon/carbon composite particles. Preferably the stabilization of the coating of the silicon/carbon composite particle is followed by controlled heating of the coated stabilized silicon/carbon composite particles so as to effect carbonization of the coated particles with little or no clumping or self-adhesion of the individual particles. The desired results are coated particles with little or no broken fracture surfaces of the type which are characteristically formed when the separate particles fuse and must be crushed or broken apart in order to provide a free flowing powder. Such fracture surfaces are desirably minimized or avoided, as they are believed to contribute to low electrochemical efficiency when the particles are used as an anode material in rechargeable electrical storage cells, particularly in rechargeable lithium ion batteries.

According to a particularly preferred embodiment of the inventive process taught herein, the carbon residue forming material is provided in a fluid form. It has been observed by the inventors that when the carbon residue forming material is precipitated from a liquid, a smooth coating forms at the interface of the individual carbonaceous particles and the surrounding liquid. A smooth coating is retained when subsequently carbonized.

Although less advantageous, when the carbon residue-forming coating is supplied as a solid, it is desirably fused on the surface of the particles in order to form a smooth coating thereon. Especially preferred embodiments of the present invention produce a free-flowing powder of coated particles after the carbonization, which particles exhibit little or no fusion among the particles, but can generally be broken into a free-flowing powder by simple mechanical agitation, such as by use of a stirring rod, or by rubbing between the thumb and forefinger. Where some fusion may have occurred between particles, and mechanical agitation is used to separate these particles which may result in the formation of new fracture surfaces, in the preferred embodiments of the invention these fracture surfaces do not comprise more than 10%, preferably no more than 2% of the total surface area of the particles. Such are considered as being substantially smooth coatings.

A preferred aspect of the present invention is in the pitch coating process, or carbon residue-forming material coating process. This coating process provides uniform carbon residue-forming coating on particles regardless of particle size. The coating can be accomplished in a number of ways but it is especially advantageous to precipitate the coating material in the presence of a suspension of the targeted particles, whether silicon, carbonaceous substrate material or silicon/carbon composite particles. This coating method yields a uniform coating of controlled composition and produces a loose particle powder, so that the pitch-coated particles do not agglomerate and no further milling process is required in the subsequent process steps.

Another preferred aspect of the present invention is in an oxidation reaction that is carried out on the coated particles prior to carbonization of the coating. The oxidation reaction is believed to provide certain technical benefits. First, it is believed that the reacted coated particles are relatively infusible following oxidation, which is particularly desirable in view of subsequent process steps, and subsequent handling of the particles. Second, it is believed that the reacted coated particles are endowed with a surface which yields high efficiency when used as an electrode, particularly when the reacted coated particles are used in an anode material in a rechargeable storage cell, particularly in a rechargeable lithium ion cell.

A further aspect of the invention contemplates the use of coated silicon or coated silicon/carbon composite particles in electrodes, particularly anodes, of electrical storage cells, particularly in rechargeable batteries. According to this aspect of the invention, there is contemplated a method for the manufacture of an electrical storage cell which comprises the steps of: incorporating into an anode of the electrical storage cell silicon materials comprising silicon/carbon composite particles having a coating layer formed of an oxidized, carbon residue forming material.

According to this aspect of the invention, the coated silicon/carbon composite particles produced from the processes described above are formed using the conventional techniques into electrodes, particularly anodes. While not described with particularity herein, it is contemplated that known-art manufacturing techniques for the assemblage of such electrodes, as well as known-art devices which facilitate in the formation of such electrodes can be used. A particular advantage which is obtained by the use of the coated particles taught herein lies in the fact that due to their coating, they rarely fuse together thus resulting in a flowable powder.

Aspects of the present invention, including certain preferred embodiments are described in the following Examples.

EXAMPLE 1

Material Preparation

The silicon powder used in this example had an average particle size of 5 μm (from Johnson Matthey Company). The pitch used for the coating layer was a petroleum pitch from Conoco, Inc. that was approximately 27% insoluble in xylene. The procedure for coating pitch on silicon powder is as follows. First, 20 grams of the silicon powder was mixed with about 100 ml of xylene so that silicon particles were uniformly dispersed in xylene in a glass flask. Concurrently, 14 grams of the pitch was mixed with an equal amount of xylene in another flask so that the pitch was completely dissolved in xylene. Both the solutions were heated to approximately 110° C. and the pitch solution was added into the silicon solution while being continuously mixed. The resulting solution was then heated to 140° C. and continuously stirred for about 15 minutes. The solution was removed from the heater and the solution gradually cooled to ambient temperature (~25° C.). While the solutions were mixed and cooled, the insoluble pitch precipitated out of solution and coated uniformly onto the silicon particles. The resulting solid particles in the solution are pitch-coated silicon powder.

The powder was then separated from the liquid by filtration and washed with 50 ml of xylene.

The pitch-coated silicon powders were then dried under vacuum at ~100° C. The total weight of the dried powder was about 23.8 g, resulting in a 16 wt % pitch coating on the silicon. The powders were then transferred into a tube furnace and heated at 1° C./minute to 300° C. and heated further for 10 hours at 300° C. under a reduced air pressure (typically ~−22" Hg). During such heat treatment (stabilization), the weight of the pitch on silicon particles increased by about 5%. Following stabilization, the powders were heated at 5° C./minute to a temperature higher than 1150° C. in nitrogen gas for 2 hours. Typically, the weight of the stabilized pitch decreased by about 25% during carbonization. Based on the amount of initial pitch prior to stabilization, the overall weight of the pitch decreased by about 20% or about 80% of the pitch remains as carbon coating after carbonization.

Figure 2:
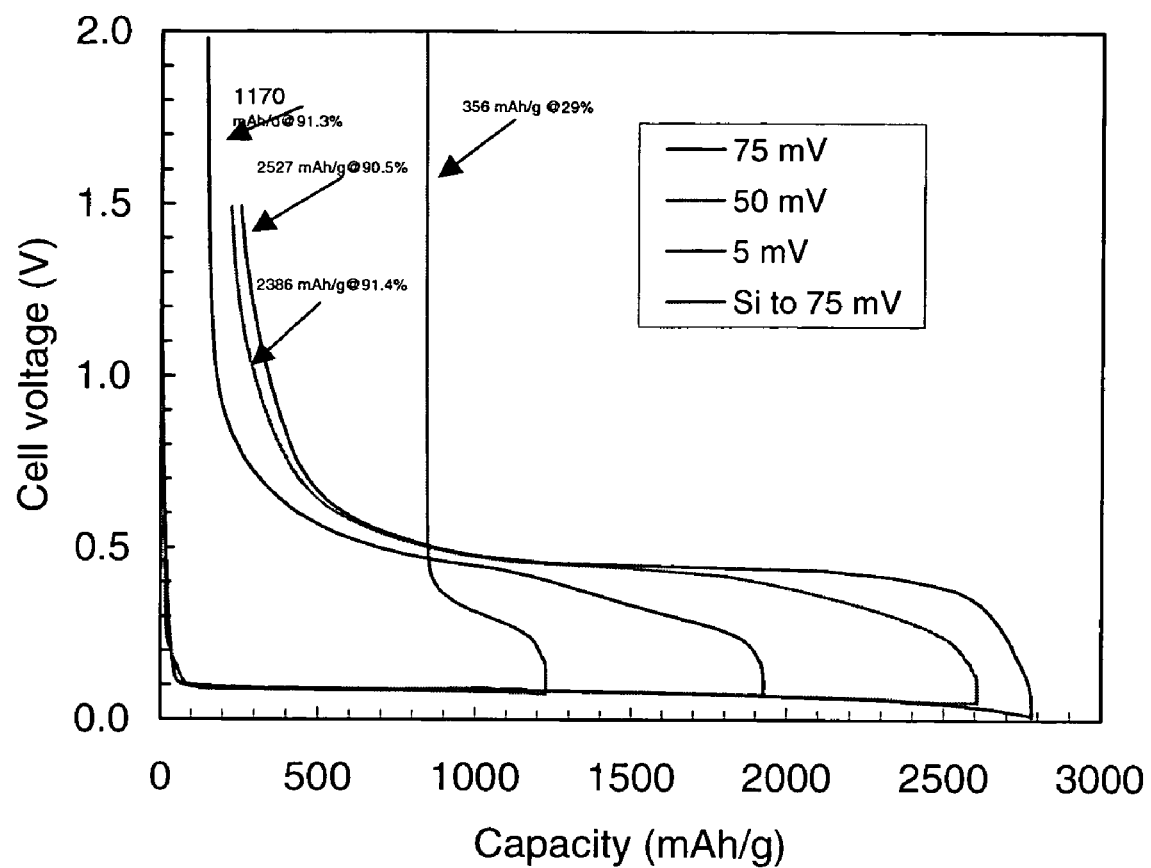
FIG. 2 shows a comparison of charge and discharge potential profiles on the first cycle for different low cut-off potentials for silicon/carbon composite particles and uncoated silicon particles.

The resulting powder was then evaluated as the anode material for a lithium-ion battery, as described below in the section "Evaluation of Electrical Capacity". FIG. 2 shows a comparison of the potential profiles during the first cycle charge and discharge for different cut-off potentials. For comparison, the potential profiles of a mechanic mixture of plain silicon and graphite powders were also shown in the figure. In this figure, the y-axis is the electrical potential of the silicon electrode versus lithium metal during the charging and discharging, the x-axis represents the charge stored into and removed from the electrode based on unit weight of the composite material. The electrical potential of the material is an indicator of the saturation level of lithium alloying; the lower the potential, the closer the material is to saturation. It can be seen that the ratio of coulombic efficiency is fairly high (>90%) for the composite carbon/silicon particles, whereas it is very low (<30%) for the mechanic mixture of graphite and plain silicon. In addition, the capacity as defined in the next section is very large for the carbon-coated silicon powder.

Evaluation of Electrical Capacity

The electrical reversible capacity and the coulombic efficiency of the powder particles according to Examples 1-3 as well as Comparative Examples were evaluated by the following techniques.

A uniform slurry was formed by thoroughly mixing powder (5 grams) with 3.82 grams of a solution containing 0.382 grams of polyvinylidene fluoride (PVDF, ex. Aldrich Chemical Co., Inc.), 3.44 g of 1-methyl-pyrrolidinone (NMP, ex. Aldrich Chemical Co., Inc.), and 0.082 grams of acetylene black (having an effective surface area of 80 $m^2/g$, ex. Alfa Aesar). The slurry was then manually cast utilizing a doctor blade to form a thin film having a loading of about 6 $mg/cm^2$ onto the rough side of an electrodeposited copper foil (10 μm, ex. Fuduka Metal Foil & Powder Co., Ltd.). The cast film was then dried on a hot plate at approx. 100° C. and pressed to a desired density (approx. 1.4 $g/cm^3$) with a roll press. A disc having an area of 1.6 $cm^2$ was then punched out from the film and weighed to determine the exact amount of the mass on the copper foil. Subsequently this disc was further dried under vacuum at a temperature of 80° C. for approximately 15 minutes and transferred into a sealed box without exposing the disc to ambient air. The sealed box was filled with ultrapure argon gas having oxygen and moisture levels of less than 1 ppm.

Subsequently the disc was cast as the positive electrode in the manufacture of a standard coin cell (2025 size) which was subsequently used as the test cell. The other electrode of the test cell was a foil of pure lithium (100 μm, ex. Alfa Aesar). A two layer separator was used in the test cell: a glass mat (GF/B Glass Microfibre Filter, Whatman International Ltd.) was used as the first layer on the composite Carbon/silicon powder and a porous polypropylene film (available as Celgard® 2300, ex. Celgard Inc.) was used as the second layer on the lithium foil. The electrolyte of the test cell was a 1 M LiPF$_6$ in ethylene carbonate (EC)/diethyl carbonate (DEC)/dimethyl carbonate (DMC) solvent mixture (40/30/30) (purchased from EM Industrial). Test cells were produced utilizing the component described above according to conventional techniques, although the samples of powder particles were varied to ensure that at least one sample coin cell was produced incorporating a powder particle sample according to either one of the demonstrative examples, or according to one of the comparative examples. These powders were tested as the anode material in a coin cell configuration of carbon/separator/lithium metal at room temperature (~25° C.). Two or three cells were made for each sample; the reported charge capacity and charge efficiency were the average value of the cells.

The capacity and charging efficiency of a specific powder particle sample was determined according to the following protocol. Utilizing a standard electrochemical test station (Model BT-2043, Arbin Instrument Corp.), an assembled test cell was first discharged (equivalently alloyed with lithium) at 0.5 mA (approx. 52 mA/g) to a given voltage on the first cycle. Thereafter, the assembled test cell was charged (de-alloyed) at 0.5 mA to 1.5 volts during which time the charge passed during charging was used to calculate the specific capacity of the composite powder, while the ratio of the total charge passed during charging to the total charge passed during discharging was used to determine the charge efficiency.

EXAMPLE 2

Figure 1A:
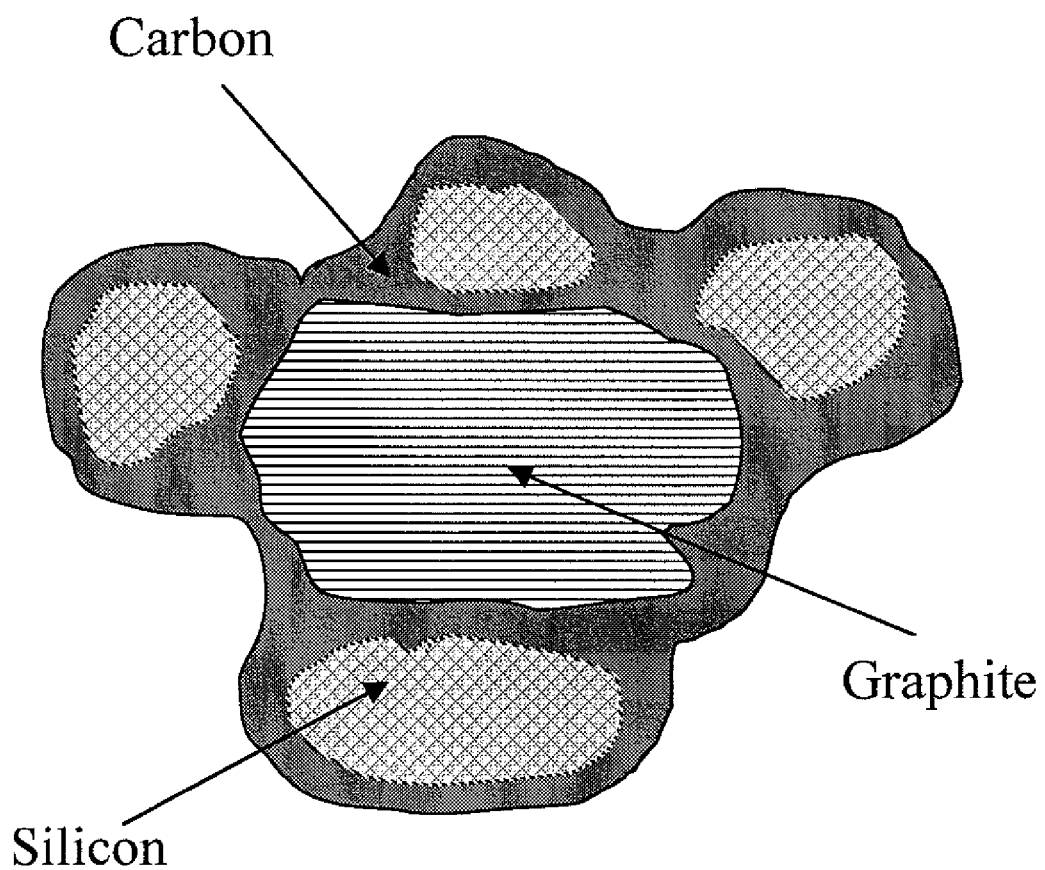
FIG. 1A shows a schematic view of a composite carbon-silicon particle according to the present invention more clearly illustrating the coatings on the particles that make up the coated composite particles.
Figure 3:
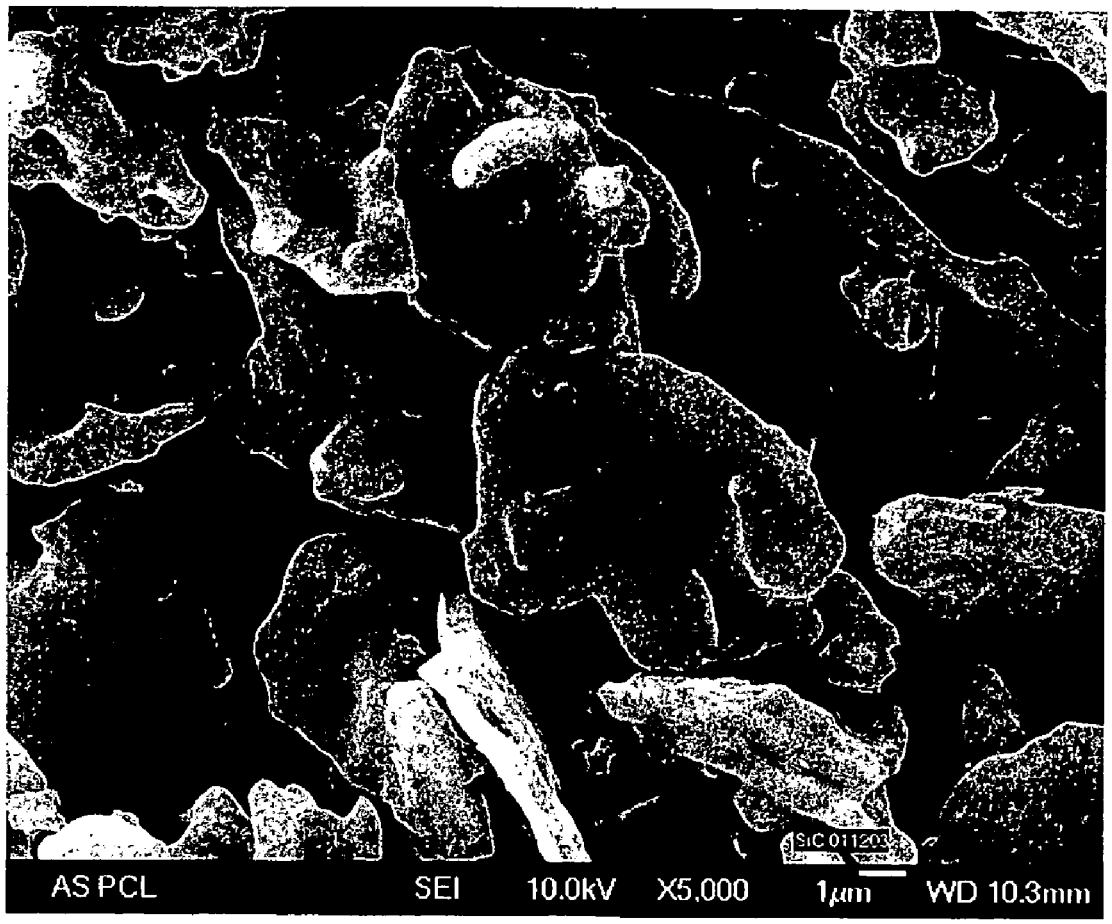
FIG. 3 shows a scanning electron microscopy image of silicon/carbon composite particles as prepared in Example 2.

Twenty grams of a natural flake graphite powder (average particle size 5 μm from China) were coated with 10 wt % petroleum pitch according to the procedure as described in Example 1. The coated graphite powder was stabilized, carbonized, and graphitized at 3000° C. in argon. Concurrently, a silicon powder (average particle size 2 μm, purchased from Johnson Matthey company) was coated with 10 wt % pitch as described in Example 1, stabilized, and carbonized at 1050° C. A mixture of the coated natural graphite powder and the coated silicon powder were combined in the proportion of 6 parts coated graphite and 4 parts of coated silicon powder and coated with 15 wt % solution of the same pitch using the same method. After stabilization in air, the resulting composite powder was carbonized at 1050° C. in nitrogen atmosphere. The resulting graphite/silicon/carbon composite particle powder has morphology as shown in FIG. 3. It can be seen that small silicon particles are embedded in the carbon coating on large graphite particles, a structure similarly illustrated in FIG. 1 and more particularly in FIG. 1A.

Figure 4:
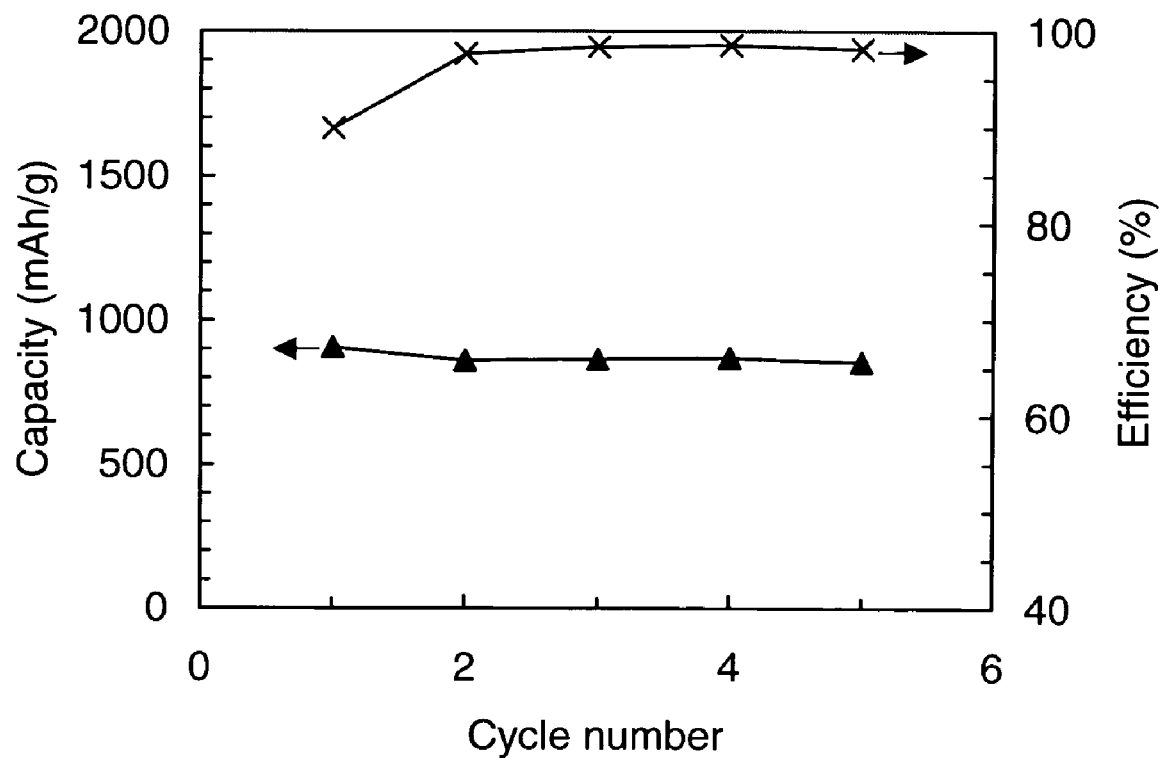
FIG. 4 shows the discharge capacity and charge efficiency within the charge/discharge potential window between 0.09 and 1.5 volts during the first 5 cycles for the silicon/carbon composite particles produced in Example 2.

The composite powder was then evaluated as the anode material for a lithium-ion battery, as described above in the section entitled "Evaluation of Electrical Capacity". The cycling potential window was between 0.09 and 1.5 volts. The results are shown in FIG. 4. It can be noted that the material has a capacity of about 850 mAh/g and is fairly reversible from cycle to cycle.

EXAMPLE 3

Figure 5:
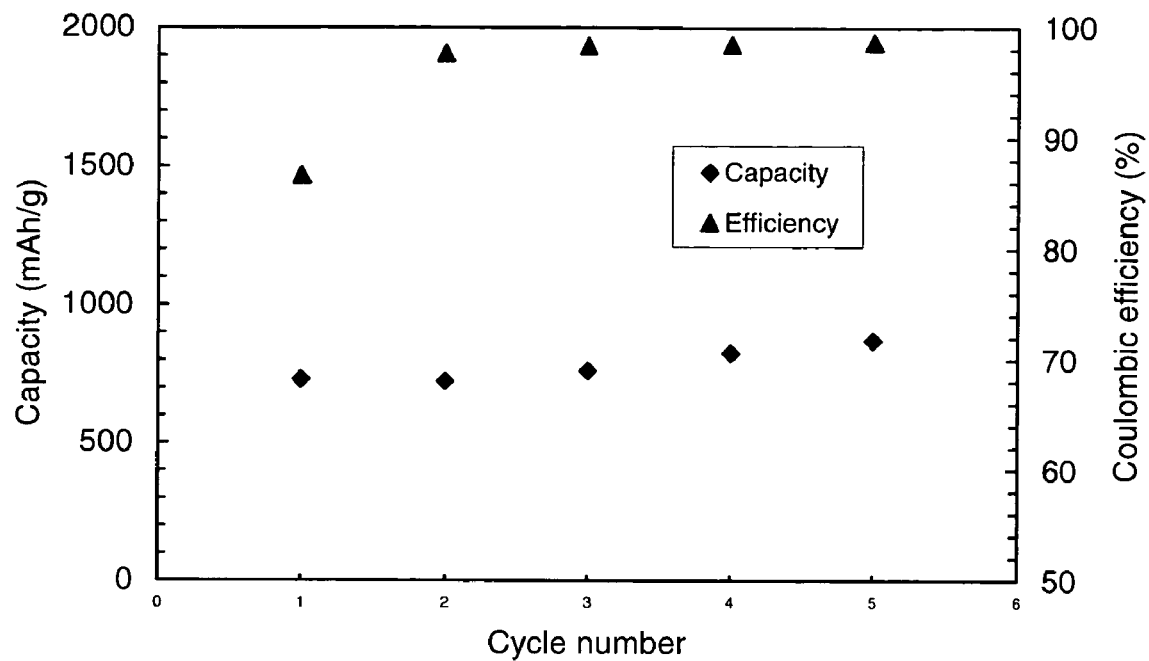
FIG. 5 shows the capacity and columbic efficiency during charge/discharge cycles between 0.09 and 1.5 volts for the composite silicon/carbon particles as prepared in Example 3.

Twenty grams of a natural flake graphite powder (average particle size 5 μm from China) were coated with 7 wt % petroleum pitch according to the procedure as described in example 1. The coated graphite powder was stabilized and carbonized at 1200° C. The coated graphite powder was mixed with the coated silicon powder as described in Example 2, in the same proportions. The mixture was then coated with 15 wt % pitch as described in Example 1 and stabilized. Subsequently, the resulting composite particle powder was coated again with 10 wt % pitch, stabilized, and carbonized at 1050° C. in nitrogen atmosphere. The material was evaluated as the anode material for Li-ion batteries in the same manner as described previously. The capacity and efficiency of this material are shown in FIG. 5 for the first five cycles. A significant increase in the rechargeability of the silicon powder is displayed.

COMPARATIVE EXAMPLE

To compare the carbon-coated silicon powder with uncoated silicon powder at the same carbon coating level, electrodes were made by adding 20% graphite to uncoated silicon and 7% of the same graphite to the carbon-coated silicon. The graphite used was natural graphite based composite graphite powder.

FIG. 2 shows the charge and discharge cell voltage profiles for the carbon-coated silicon and uncoated silicon powders. It should be noted that "charging" means that the lithium is being electrochemically inserted into the electrode and "discharging" denotes that the lithium is being removed from the electrode. The charge and discharge capacity was calculated based on total electrode material except for the binding material. As shown in the figure, the cell voltage rapidly drops to the low cut-off voltage on the charging and the discharged capacity and the efficiency are very small for the silicon/graphite mixture electrode.

That which is claimed:

1. A process for the production of coated silicon/carbon particles comprising:
    a) providing a carbon residue forming material having a range of molecular weight species and which is subject to becoming substantially infusible by oxidative stabilization and further which, when oxidized and then thermally decomposed in a substantially inert atmosphere at a carbonization temperature of at least 850° C., forms a residue which is at least 95 wt. % carbon;
    b) providing silicon particles in the form of a first dispersion with one or more solvents;
    c) coating said silicon particles with said carbon residue forming material by dissolving the carbon residue forming material in a first flux solution with one or more suitable solvents and then combining the first dispersion with the first flux solution thereby causing a fraction of the residue forming material at the higher end of the molecular weight range, which also has a higher melting point, to precipitate onto the silicon particles as a coating thereon to form coated silicon particles;
    d) providing particles of a carbonaceous material in the form of a second dispersion with one or more solvents;
    e) coating said particles of carbonaceous material with said carbon residue forming material by dissolving the carbon residue forming material in a second flux solution with one or more suitable solvents and then combining the second dispersion with the second flux solution thereby causing a fraction of the residue forming material at the higher end of the molecular weight range, which also has a higher melting point, to precipitate onto the carbonaceous particles as a coating thereon to form coated carbonaceous particles;
    f) embedding said coated silicon particles onto said coated carbonaceous particles to form silicon/carbon composite particles;

g) coating said silicon/carbon composite particles with a carbon residue forming material by dissolving the carbon residue forming material in a third flux solution with one or more suitable solvents and then combining the third dispersion with the third solution thereby causing a fraction of the residue forming material at the higher end of the molecular weight range, which also has a higher melting point, to precipitate onto the silicon/carbon particles as a substantially smooth coating thereon to form coated silicon/carbon composite particles wherein the total amount, molecular weight and melting point of said coating are controlled by adjusting the total ratio of the solvent to the carbon residue-forming material and the solution temperature; and h) stabilizing the coated composite particles by subjecting said coated composite particles to an oxidation reaction in the presence of an oxidizing agent at a temperature which is below the instantaneous melting temperature of the residue forming material to render the coating infusible to subsequent steps;

j) carbonizing the coated composite particles in a substantially inert atmosphere by subjecting the stabilized coated composite particles from step h) by raising the temperature in a controlled manner from a starting temperature to a final carbonization temperature of at least 850° C. wherein the underlying silicon/carbonaceous particles are protected by the coatings formed thereon;

wherein step e) is carried out separately from steps f) and g).

2. The process of claim 1, further comprising stabilizing the silicon particles after coating.

3. The process of claim 1, further comprising stabilizing the carbonaceous particles after coating.

4. The process of claim 2, further comprising carbonizing the silicon particles.

5. The process of claim 3, further comprising carbonizing the carbonaceous particles.

6. The process of claim 4, wherein the coated silicon particles are carbonized in an inert atmosphere at a temperature of between about 400° C. to about 1500° C.

7. The process of claim 5, wherein coated carbonaceous particles are carbonized in an inert atmosphere at a temperature of between about 400° C. to about 1500° C.

8. The process of claim 1, wherein the suitable solvents for the first, second and third flux solutions are selected from the group consisting of toluene, benzene, xylene, quinoline, tetrahydrofuran, tetrahydronaphthalene, naphthalene, methanol, acetone, methyl-pyrrolidinone, cyclohexane, ether and water.

9. The process of claim 1, wherein the ratio of the one or more solvents to the carbon residue forming material in the mixture of the carbon residue forming material solution and the particle suspension is 4:1 or more.

10. The process of claim 1, wherein at least a portion of the coating of carbon residue forming material is precipitated under ambient or higher pressure.

11. The process of claim 10, wherein at least a portion of the coating of carbon residue forming material is precipitated at a temperature of about −5° C. to about 400° C.

12. The process of claim 1, wherein all of the coatings of carbon residue forming material are uniform and substantially smooth.

13. The process of claim 1, wherein the stabilized coated silicon/carbon composite particles are further coated with carbon residue forming material to form an additional coating layer of carbon residue forming material on substantially each of the composite particles.

14. The process of claim 13, wherein the multiple coated silicon/carbon composite particle is still further coated with carbon residue forming material to form additional coating layers of carbon residue forming material.

15. The process of claim 13, wherein the final coating layer of the silicon/carbon composite particle is carbonized.

16. The process of claim 1, wherein the carbonaceous particles comprise a pulverulent carbonaceous material selected from the group consisting of petroleum pitches, calcined petroleum cokes, uncalcined petroleum cokes, highly crystalline cokes, coal tar cokes, synthetic graphites, natural graphites, soft carbons derived from organic polymers, and soft carbons derived from natural polymers.

17. The process of claim 1, wherein the carbonaceous particles have an average particle size of up to about 50 μm.

18. The process of claim 1, wherein the carbonaceous particles have an average particle size of between about 1 μm to about 30 μm.

19. The process of claim 1, wherein the silicon particles have an average particle size of up to about 50 μm.

20. The process of claim 1, wherein the silicon particles have an average particle size of between about 0.03 μm and about 20 μm.

21. The process of claim 1, wherein the carbon residue forming material is a polymeric material selected from the group consisting of heavy aromatic residues from petroleum and coal of chemical processes, lignin from pulp industry, phenolic resins, and carbohydrate materials.

22. The process of claim 1, wherein the carbon residue forming material is selected from the group consisting of petroleum pitches, coal tar pitches, and pitches produced by chemical processes.

23. The process of claim 1, wherein the oxidation reaction is carried out at elevated temperatures.

24. The process of claim 23, wherein the elevated temperature is supplied in a controlled manner with temperature ramps and hold periods.

25. The process of claim 1, wherein the oxidation reaction is carried out under reduced pressure.

26. A process for the production of coated silicon/carbon composite particles having substantially smooth coatings formed of an oxidized, carbon residue forming material comprising:

a) providing a first flux solution of a carbon residue forming material selected from the group consisting of petroleum pitches and coal tar pitches having a range of molecular weight species, wherein the first flux solution comprises one or more solvents selected from the group consisting of toluene, xylene, quinoline, tetrahydrofuran, tetrahydronaphthalene, and naphthalene;

b) providing particles of a carbonaceous material selected from the group consisting of calcined or un-calcined petroleum cokes, natural graphite and synthetic graphite, wherein the particles are provided in a first suspension comprising one or more solvents;

c) mixing the first flux solution and the first suspension at an elevated temperature;

d) depositing a coating of the carbon residue forming material onto the surface of the carbonaceous particles to form coated carbonaceous particles by selective precipitation of the carbon residue forming material such that a fraction at the higher end of the molecular weight range, which also has a higher melting point, precipitates onto the carbonaceous particles as a smooth coating thereon;

e) providing particles of silicon, wherein the silicon particles are provided in a second suspension comprising one or more solvents;

f) mixing additional first flux solution with the second suspension at an elevated temperature;
g) depositing a coating of the carbon residue forming material onto the surface of the silicon particles to form coated silicon particles by selective precipitation of the carbon residue forming material such that a fraction at the higher end of the molecular weight range, which also has a higher melting point, precipitates onto the silicon particles as a smooth coating thereon;
h) mixing additional first flux solution with the coated silicon particles and the coated carbonaceous particles at an elevated temperature;
i) depositing a coating of the carbon residue forming material onto the coated silicon particles and the coated carbonaceous particles to embed the coated silicon particles onto the coated carbonaceous particles to form coated silicon/carbon composite particles by selective precipitation of the carbon residue forming material such that a fraction at the higher end of the molecular weight range, which also has a higher melting point, precipitates onto the silicon/carbon composite particles as a smooth coating thereon wherein the total amount, molecular weight and melting point of said coating are controlled by adjusting the total ratio of the solvent to the carbon residue-forming material and the solution temperature;
j) stabilizing the coated composite particles by subjecting the particles to an oxidation reaction in the presence of an oxidizing agent at a temperature below the instantaneous melting temperature of the carbon residue forming material; and
k) carbonizing the coated composite particles in a substantially inert atmosphere;
wherein steps d), g) and i) are carried out separately.

27. The process of claim 26, wherein the coated composite particles are carbonized in an inert atmosphere at a temperature of greater than about 400° C. up to about 1500° C.

28. The process of claim 26, wherein the coated composite particles are carbonized in an inert atmosphere at a temperature of between about 550° C. to about 1500° C.

29. A process for the production of coated silicon/carbon composite particles having substantially smooth coatings formed of an oxidized, carbon residue forming material comprising:
a) providing a first flux solution of a carbon residue forming material selected from the group consisting of petroleum pitches and coal tar pitches having a range of molecular weight species, wherein the first flux solution comprises one or more solvents selected from the group consisting of toluene, xylene, quinoline, tetrahydrofuran, tetrahydronaphthalene, and naphthalene;
b) providing particles of a carbonaceous material selected from the group consisting of calcined or uncalcined petroleum cokes, natural graphite and synthetic graphite, wherein the particles are provided in a first suspension comprising one or more solvents;
c) mixing the first flux solution and the first suspension at an elevated temperature;
d) depositing a coating of the carbon residue forming material onto the surface of the carbonaceous particles by selective precipitation of the carbon residue forming material such that a fraction at the higher end of the molecular weight range, which also has a higher melting point, precipitates onto the carbonaceous particles as a smooth coating thereon to form coated carbonaceous particles;
e) providing particles of silicon, wherein the silicon particles are provided in a second suspension comprising one or more solvents;
f) mixing the first flux solution with the silicon particles and the coated carbonaceous particles at an elevated temperature;
g) depositing a coating of the carbon residue forming material onto the surface of the silicon particles and the coated carbonaceous particles to embed the silicon particles onto the coated carbonaceous particles to form coated silicon/carbon composite particles by selective precipitation of the carbon residue forming material such that a fraction at the higher end of the molecular weight range, which also has a higher melting point, precipitates onto the silicon/carbon composite particles as a smooth coating thereon;
h) depositing a layer of carbon residue forming material onto the surface of the silicon/carbon composite particles by adding additional first flux solution to the silicon/carbon composite particles from step g) causing selective precipitation of the carbon residue forming material such that a fraction at the higher end of the molecular weight range, which also has a higher melting point, precipitates onto the silicon/carbon composite particles as a smooth coating thereon wherein the total amount, molecular weight and melting point of said coating are controlled by adjusting the total ratio of the solvent to the carbon residue-forming material and the solution temperature;
i) stabilizing the coated composite particles by subjecting the particles to an oxidation reaction in the presence of an oxidizing agent; and
j) carbonizing the coated composite particles in a substantially inert atmosphere;
wherein steps d), g) and h) are carried out separately.

30. The process of claim 29, wherein the coated particles are carbonized in an inert atmosphere at a temperature of greater than about 400° C. to about 1500° C.

31. The process of claim 29, wherein the coated particles are carbonized in an inert atmosphere at a temperature of between about 550° C. to about 1500° C.

32. The process of claim 14, wherein the final coating layer of the silicon/carbon composite particle is carbonized.

33. The process of claim 1, wherein the coating of the particles is effected by partial precipitation of the carbon residue forming material onto the surface of the particles and wherein the partial precipitation is effected by dilution of a concentrated solution of a carbon residue forming material by adding more of the same or one or more different solvents.

34. The process of claim 33, wherein the ratio of solvent to carbon residue forming material in the concentrated solution is 2:1 or less and the ratio of solvent to carbon residue forming material in the diluted solution is greater than 2:1.

35. The process of claim 33, wherein the ratio of solvent to carbon residue forming material in the concentrated solution is 2:1 or less and the ratio of solvent to carbon residue forming material in the diluted solution is greater than 5:1.

36. The process of claim 33, wherein partial precipitation of the carbon residue forming material is effected by cooling the mixture of the silicon and carbonaceous particles and carbon residue forming material during the coating step.

37. The process of claim 1, wherein the coating of carbon residue forming material is deposited under ambient or higher pressure.

* * * * *